INVENTORS
MASAO ISONO
TAKESHI TAKAHASHI
YOSHIO YAMAZAKI

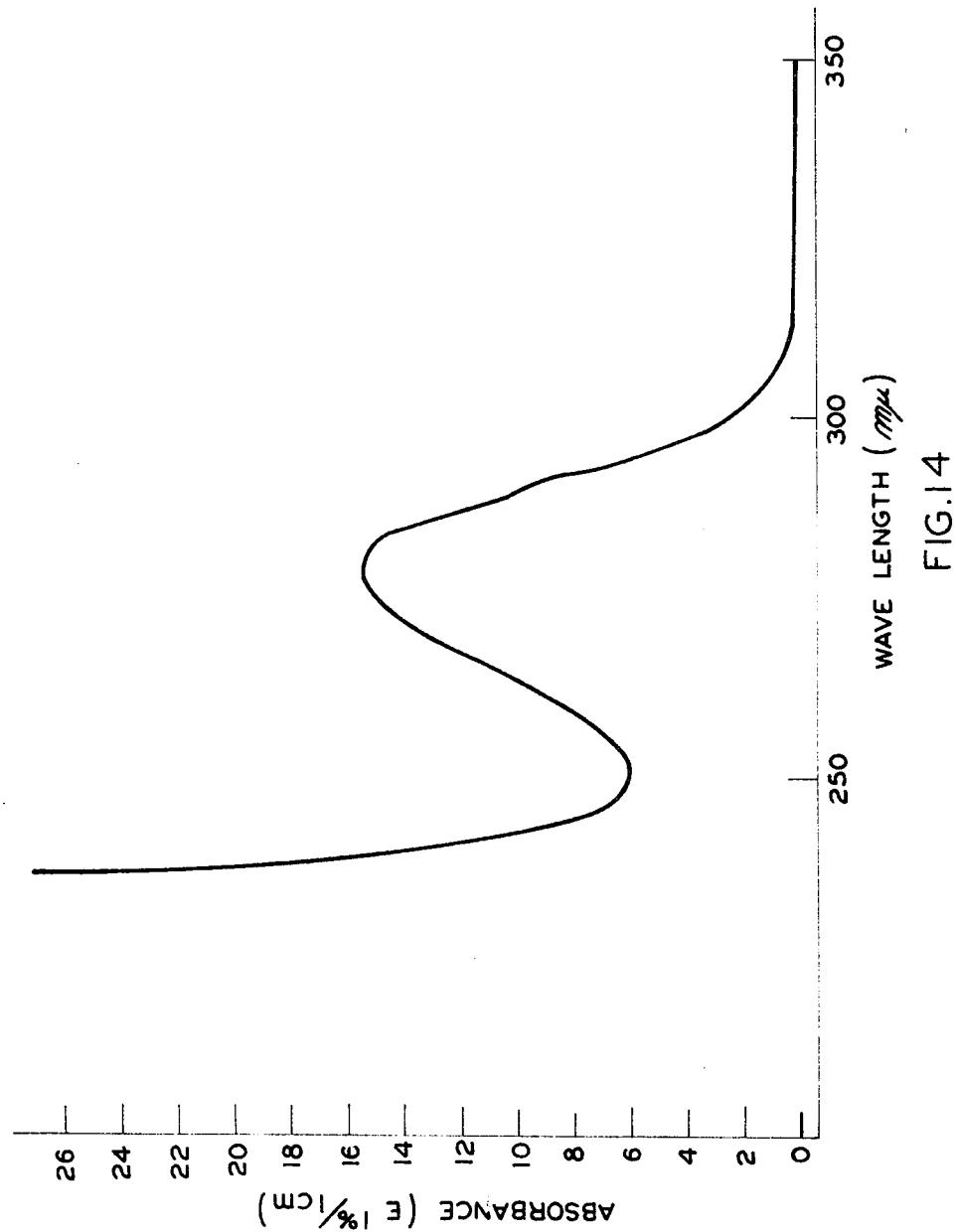

United States Patent Office 3,649,454
Patented Mar. 14, 1972

3,649,454
BACTERIOLYTIC ENZYME AND PROCESS FOR THE PRODUCTION THEREOF
Masao Isono, Nishinomiya, and Takeshi Takahashi and Yoshio Yamazaki, Osaka, Japan, assignors to Takeda Chemical Industries, Ltd., Higashi-ku, Osaka, Japan
Filed Jan. 19, 1970, Ser. No. 3,920
Claims priority, application Japan, Jan. 18, 1969, 44/3,659
Int. Cl. C12d *13/10;* A61k *19/00*
U.S. Cl. 195—62
5 Claims

ABSTRACT OF THE DISCLOSURE

Bacteriolytic enzyme is produced by cultivating a bacteriolytic enzyme-producing microorganism belonging to the genus Achromobacter in a growth medium and recovering the accumulating bacteriolytic enzyme therefrom. The bacteriolytic enzyme and preparations containing it are specifically useful in detergent compositions, oral compositions for use in preventing dental cavities and eyewash compositions.

---

Figure 1:
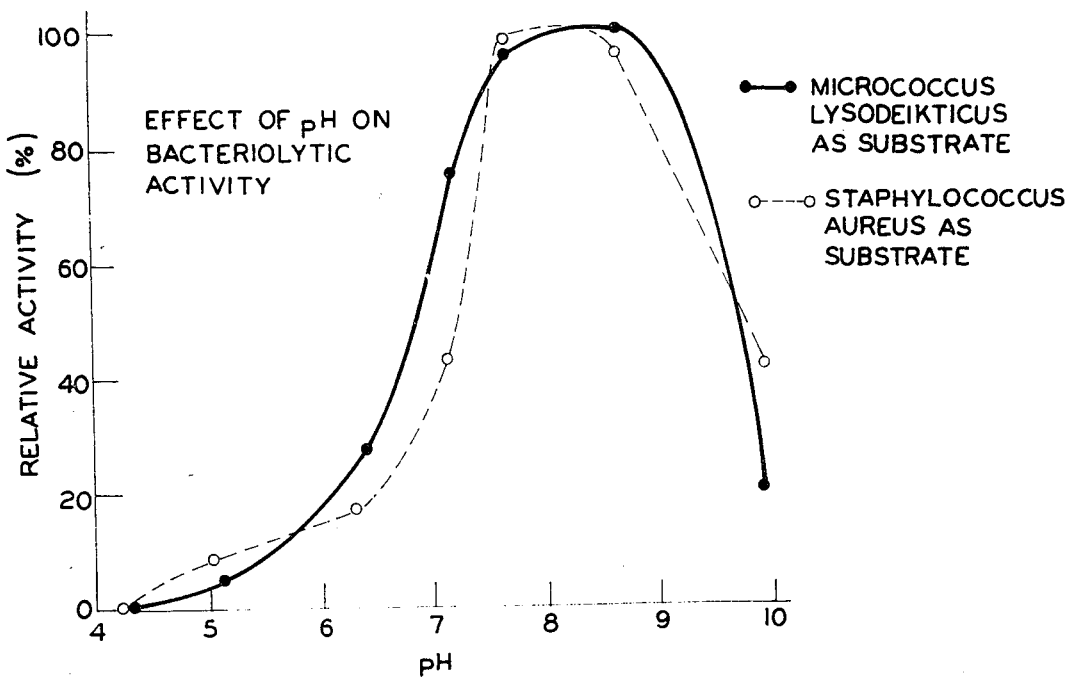

The present invention is concerned with a novel bacteriolytic enzyme and with a process for the production thereof.

The present invention is based on the following observations:

(1) that there exist microorganisms capable of producing the novel bacteriolytic enzyme;
(2) that the microorganisms capable of producing the enzyme belongs to the genus Achromobacter;
(3) that the enzyme is accumulated in a culture broth when the microorganisms are cultured;
(4) that the enzyme so-accumulated can be recovered in a desired purity from the culture broth; and
(5) that the enzyme has a strong bacteriolytic activity against many kinds of Gram-positive bacteria.

Egg-white lysozyme has been known as the most typical bacteriolytic enzyme and is the only one that has been producible on an industrial scale. However, egg-white lysozyme shows only a narrow bacteriolytic spectrum and, for instance, it shows no bacteriolytic activity against such pathogenic bacteria as belong to the genus Staphylococcus, Clostridium and Streptococcus.

The bacteriolytic enzyme prepared according to the present invention, on the contrary, shows much broader bacteriolytic spectrum than egg-white lysozyme and can act upon almost all Gram-positive bacteria.

The microorganisms employable in this invention comprisesprises for example *Achromobacter lyticus* M–497–1 (ATCC 21456) and P–365 (ATCC 21457) which were isolated from soil and named as above by the present inventors. The latter strain is considered to be a variant of the former in view of a similarity of their microbial characteristics to each other. In the instant specification "ATCC" refers to American Type Culture Collection, Rockville, Md.

The following are of the microbial characteristics of the *Achromobacter lyticus* M–497–1 and P–365 (hereinafter, the characteristic described are common to both strains unless otherwise stated).

(1) Morphological characteristics

Rods, 0.4 to 0.5 by 1.5 to 3$\mu$, with rounded ends, occurring singly or occasionally in pairs. Non-sporulation. Non-motile. No flagellum. Gram-negative.

(2) Cultural characteristics (a) Bouillon agar surface colonies:
 M–497–1; Lenticular in 2 mm. diameter, with smooth, luster and transparent surface.
 P–365; Circular in 2 mm. diameter with raised center and with rough, non-luster semi-transparent surface.
 Coloring pale yellowish gray, without production of pigment. After 1 week or longer, pale brown color extends over surface.
(b) Bouillon agar slants:
 M–497–1; Raised filiform with smooth, luster and transparent appearance.
 P–365; Flat filiform with rough, non-luster and semi-transparent appearance.
 As to tint, the same as in (a).
(c) Gelatin surface colonies:
 Grayish white. Rapid liquefaction of gelatin, only small colonies (0.5 mm. or shorter in diameter) are formed.
(d) Gelatin stab culture:
 Infundibuliform or stratal liquefaction. Cells are colored grayish white and precipitated.
(e) Bouillon:
 M–497–1; Turbid homogenously. Ring is rarely formed. Colored brown in surface portion.
 P–365; Turbid homogeneously and subsequent ring formation. A slight pellicle formation and precipitation.
(f) Peptone;
 Turbid homogeneously and subsequent ring formation and precipitation. Poorer growth than on (e).
(g) Potato slants:
 Pale yellowish white. Fairly good growth. Smooth and luster surface, becoming brown to brownish black over about 1 week. Medium is colored black.
(h) Litmus milk:
 Weak alkali, rapid peptone liquefaction. Gradual reduction of litmus.
(i) Coagulated blood serum slants:
 Light brownish gray. Liquefaction of medium.
(j) Tyrosine-containing bouillon agar slants:
 Same growth and tint as on (b). After 3 days, brown color extends into agar.
(k) Glucose-containing bouillon slants:
 Better growth than on (b). Same tint as on (a) except of no appreciable change into brown.
(l) Litmus milk agar slants:
 Grayish white without production of pigment. Smooth luster appearance.

(3) Physiological characteristics (a) Oxygen requirement:
 Aerobic.
(b) pH value relations:
 Optimum, pH 7.0. Growth at a range of pH 5.5 to 9.0.
(c) Temperature relations:
 Optimum, 30° C. Growth at a range of 8 to 37° C.
(d) Resistance to salts:
 Growth on 2% NaCl-containing bouillon. No growth on 3% NaCl-containing bouillon.
(e) Heat resistance:
 Killed by heating at 50° C. for 10 minutes.
(f) Methyl-red test:
 Negative.
(g) Voges-Proskauer reaction:
 Negative.
(h) Gelatin liquefaction:
 Liquefying gelatin.
(i) Casein hydrolysis:
 Hydrolyzing casein.

(j) Starch decomposition:
  Not producing colorless transparent zone around cells by the aid of iodine solution.
(k) Indole production:
  None.
(l) Hydrogen sulfide production:
  None.
(m) Nitrous acid production from nitric acid:
  None.
(n) Ammonia production:
  Observed.
(o) Catalase action:
  Positive.
(p) Ammonia utilization:
  Observed.
(q) Nitrates utilization:
  Not observed.
(r) Urea utilization:
  Not observed.
(s) Citric acid utilization:
  Observed.
(t) p-Hydroxy benzoic acid utilization:
  Not observed.
(u) Carbohydrates utilization:
  Utilizing glucose, fructose, galactose, mannose, lactose, sucrose, maltose, trehalose, raffinose and dextrin, with production of acids but of no gas. Not utilizing arabinose, rhamnose, xylose, inulin, glycerine, mannitol, sorbitol, dulcitol and chitin. Utilizations of sucrose and raffinose are rather weak, and no appreciable growth and acid production are observed before 2 week cultivation in M–497–1 and 1 week cultivation in P–365.
(v) Producing enzyme capable of lysing cells of bacteria.

Comparison of the above-mentioned characteristics with the description of Bergey's Manual of Determinative Bacteriology the 7th edition (1957) shows that the strains employable in the present invention should be classified as belonging to the class Shizomycetes, the order Eubacteriales and the family Achromobacteracea. The family Achromobacteracea consists of five genera, Alkaligenes, Achromobacter, Flavobacterium, Agarbacterium and Beneckea.

The present strains do not belong to the genus Alkaligenes in view of the production of acid from sugars, and do not belong to the genus Agarbacterium nor the genus Beneckea in view of being incapable of decomposing agar and chitin. Further, the present strains do not belong to the genus Flavobacterium in view of the unproducibility of pigment, i.e. ordinary agar media only become slightly yellowish gray upon cultivation.

Thus, the present strains are classified as belonging to the genus Achromobacter. The brown pigments described in (2)-(a), (e), (g), (j), etc. are considered to be melanine-like substances in view of the fact that the production thereof is remarkably accelerated by the presence of tyrosine and oxygen. The pigments are further considered to be secondarily produced because the supernatant formed by centrifuging the culture broth of the strain on a bouillon medium gradually becomes brown when kept at 4° C. Therefore, the brown pigment producibility of the strain is not contradictory to the conclusion that it should be classified as belonging to the genus Achromobacter.

The examination of the above-mentioned characteristics results in the conclusion that the present strains are analogous species to *Achromobacter butyri*. However, there are found significant differences between the present strains and *Achromobacter butyri* in the following points: Namely, *Achromobacter butyri* is of short rods of 1μ or shorter in length, shows only a slight liquefaction of gelatin, does not alkalize nor peptonize litmus milk, and grows poorly on potato slants. Further, optimum temperature for growth of the *Achromobacter butyri* is 25° C. and the source of the *Achromobacter butyri* is milk.

From the afore-mentioned facts, the microorganisms of the present invention can be concluded to be a novel species, and thus, are named *Achromobacter lyticus* by the present inventors.

There are many mutants and variants of *Achromobacter lyticus*, and among the mutants and variants, regardless of whether the variation and/or mutation may be caused spontaneously or artificially, for instance, by X-ray treatment, ultraviolet-ray treatment or by the action of chemical reagents; any one of these which can produce the novel bacteriolytic enzyme can be employed in the present invention and for purposes of the invention are substantial equivalents.

In the present invention, the novel bacteriolytic enzyme producing strain belonging to the genus Achromobacter is incubated in a medium containing assimilable carbon sources, nitrogen sources and other necessary nitrients.

As the carbon sources, there can be used, for example, glucose, sucrose, dextrin, starch, lactose, maltose, galactose, mannose, fructose, trehalose, raffinose, normal paraffines, acetic acid, etc. The nitrogen sources employable include, for example, peptone, meat extract, yeast extract, dry yeast, soybean powder, casein, Casamino acid, various amino acids and ammonium salts, and other organic or inorganic nitrogen-containing compounds. Further, a small amount of inorganic salts such as phosphate, sulfate, carbonate and chloride of metals such as sodium, potassium, calcium and magnesium may be added to the medium. And, if necessary, for the purpose of accelerating the growth of the microorganism and the acculation of the bacteriolytic enzyme, there may be added various vitamins, nucleic acids or their derivatives and other conventional nutrients.

For cultivation of the present microorganism, the medium may be either liquid or solid, and the method of cultivation may for example be static or shaking. And, generally stating, it is desirable to conduct the culture under aerobic conditions (e.g. shaking culture, aeration-agitation culture, etc.).

The culture conditions such as temperature, culture period, pH of the medium and degree of aeration vary with the strain used and the composition of the medium, etc. and are determined so that the production of enzyme is maximum. Generally, the culture is conducted in the pH range from neutral to alkaline at 20 to 35° C., preferably at 25 to 30° C. for 1 to 2 days under aeration of 0.5 to 1.5 liter air/liter medium.

Thus, the desired enzyme is accumulated in the culture broth. The acculated enzyme can be separated and purified in a desired purity by a conventional manner, for instance, the culture broth is subjected to centifugation or filtration to remove bacterial cells and to the supernatant or filtrate is added a salt such as ammonium sulfate to salt-out the object product, or a hydrophilic organic solvent such as alcohols (e.g. methanol, ethanol, etc.) and acetone to precipitate fractionally the desired product. Thus obtained product can further be purified by using, singly or in combination, various techniques such as adsorption-desorption method using alumina, bentonite, calcium phosphate gel, activated carbon, etc., chromatography method using ion-exchange resins, ion-exchange cellulose derivatives, etc. and the molecular sieve method using Sephadex (manufactured by Pharmacea, Uppsala, Sweden), Biogel (Bio-Rad Laboratories, Calif., U.S.A.), etc. Isoelectric precipitation, dialysis, electrophoresis and precipitation with a heavy metal ion may also be applied for this purpose.

The enzyme system prepared by the present invention contains at least two kinds of bacteriolytic enzymes as well as non-bacteriolytic proteases. Though the enzyme system may be separated into each component, the whole enzyme system as such shows high bacteriolytic action and thus can advantageously be put into practical use without separation into individual components.

The present invention is further illustrated referring to the examples, where in relation between weight part(s) and volume part(s) is the same as that between gram(s) and mililitre(s).

In the following examples, the bacteriolytic activity and proteolytic activity are determined by the method as mentioned below unless otherwise stated. As to the bacteriolytic activity, *Micrococcus lysodeikticus* is used as substrate unless otherwise stated.

Bacteriolytic activity

To 4.0 ml. of 0.01 M tris-HCl buffer (pH 8.0) containing lyophilized cells of *Micrococcus lysodeikticus* or *Staphylococcus aureus* as a substrate to give approximately 0.60 (Absorbance —A—) of reading at 600 m$\mu$ on a Shimadezu Bausch & Lomb Spectronic 20 colorimeter, 0.1 ml. of enzyme solution is added and incubated at 37° C. Reduction in absorbance ($\Delta$A) at 600 m$\mu$ is read after 5 minutes. One unit (abbreviated as LU) of the bacteriolytic activity is defined as the amount of enezyme which, under the assay condition, reduces the absorbance 0.001 per minute. Thus, the unit in 1.0 ml. of enzyme solution is calculated according to the following equation:

$$\text{Unit} = (\Delta A) \times 41/(0.001 \times 5)$$

Proteolytic activity

Two ml. of 1.0% casein in 0.01 M tris-HCl buffer (pH 9) is mixed with 0.1 ml. of enzyme solution and incubated at 37° C. After 20 minutes, reaction is stopped by addition of 3.0 ml. of 5% trichloroacetic acid (TCA) solution. After standing for 30 minutes, the reaction mixture is filtered and the absorbance of the filtrate is measured at 275m$\mu$ with a Beckmann DB spectrophotometer. One unit (abbreviated as PU) of proteolytic activity is defined as the amount of enzyme which liberates TCA soluble material equivalent to 1$\mu$ g. of tyrosine per minute.

In the following description, "parts" means "parts by weight," unless otherwise stated, and the relation between "parts by weight" and "parts by volume" is the same as that between "gram" and "mililitre."

Example (1) 50 volume parts of a liquid medium containing 1% peptone, 0.5% casein, 1.0% sucrose, 0.01% potassium dihydrogen phosphate and 0.01% magnesium sulfate heptahydrate, being adjusted to pH 7.2, is sterilized in a fermenter of 200 volume parts capacity, inoculated with *Achromobacter lyticus* M–497–1 (ATCC 21456) or *Achromobacter lyticus* P–365 (ATCC 21457), and incubated at 28° C. by means of a rotary type shaking culture machine at a rate of 240 r.p.m.

After about 48 hours incubation, the growth of the microorganism and the bacteriolytic activity become maximum. A supernatant of the culture broth shows the following activities after about 48 hours incubation.

TABLE 1

| Strain | Bacteriolytic activity, LU/ml. | Proteolytic activity, PU/ml. |
| --- | --- | --- |
| M–497–1 | 2,560 | 766 |
| P–365 | 1,760 | 444 |

(2) 100 volume parts of a seed culture of the strain M 497–1 obtained by the same procedure as in (1) is inoculated to a fermenter containing 2000 volume parts of the same liquid medium as in (1) and incubated at 28° C. with agitation under aeration of 1000 volume parts of air per minute, while an antifoaming agent is added so as to inhibit foaming caused by the growth of the microorganism. After about 20 hours incubation, the accumulation of the enzyme as well as the growth of the microorganism becomes maximum (about 3000 LU/ml.).

(3) 1500 volume parts of the culture prepared above is inoculated in a fermenter containing 30,000 volume parts of the same liquid medium as in (1) and incubated at 28° C. with agitation under aeration of 15,000 volume parts of air per minute for 18 hours. A supernatant of the resulting culture broth shows 4500 LU/ml. and 930 PU/ml.

(4) 30,000 volume parts of the culture broth prepared in (3) is cooled to about 12° C., followed by centrifuging to eliminate the bacterial cells whereby 28,000 volume parts of supernatant fluid is obtained. To the supernatant fluid is slowly added with gentle agitation 100,000 volume parts of acetone cooled to —10° C., followed by keeping the mixture standing as such for 3 hours. Resulting precipitates are centrifugally recovered. This procedure yields 120 weight parts of wet precipitates. The wet precipitates are washed with 6000 volume parts of cold acetone, dried in air and further dried in a desiccator under reduced pressure for 2 days, whereby 39 weight parts of a white powdery enzyme preparation is obtained.

The biological and physical properties of the above obtained enzyme preparation are described below:

(i) The enzyme preparation shows 2500 LU/mg., and 580 PU/mg.) and no lipase, amylase, cellulase nor nuclease activity.

(ii) Approximate chemical composition thereof is:
Protein: about 60% (calculated from N-content)
Carbohydrate: about 20% (glucose as standard, phenolsulfuric acid method)
Water: about 10% (reduction in weight after 3 hours heating at 105° C.)

(iii) Absorbance at 280 m$\mu$ is about 0.6 for a 0.1% solution of the enzyme preparation.

(iv) Acute toxicity of the enzyme preparation in mice and rats after 7 days from the administration is shown in the following table:

| Administration | Mice | Rats |
| --- | --- | --- |
| Oral | No animal died at 4,340 mg./kg. | No animal died at 4,340 mg./kg. |
| Intravenous | LD50=18.3 mg./kg. | LD50=8.9 mg./kg. |

(v) Fresh cells of the microorganisms described in Table 2 are harvested and suspended in 0.01 M Tris-HCl buffer (pH 8). To each of the suspension is added the enzyme preparation in an amount of 300 LU/ml., followed by keeping the mixture at 37° C. On thus treated suspension, bacteriolytic activity is measured according to the manner as described before.

The result is as follows:

TABLE 2.—BACTERIOLYTIC SPECTRUM

| Microorganism a | IFO No. | Bacteriolytic activity b |
| --- | --- | --- |
| *Micrococcus caseolyticus* | 3760 | +++ |
| *Micrococcus cerificans* | 12552 | — |
| *Micrococcus flavus* | 3242 | +++ |
| *Micrococcus freudenreichii* | 3778 | + |
| *Micrococcus luteus* | 3763 | + |
| *Micrococcus lysodeikticus* | 3333 | +++ |
| *Micrococcus roseus* | 3764 | +++ |
| *Micrococcus rubens* | 3768 | +++ |
| *Micrococcus subflavus* | 3062 | + |
| *Micrococcus ureae* | 3767 | — |
| *Micrococcus varians* | 3765 | +++ |
| *Sarcina lutea* | 3232 | +++ |
| *Sarcina marginata* | 3066 | +++ |
| *Pediococcus acidilactici* | 3884 | +++ |
| *Pediococcus pentosaceus* | 3892 | ++ |
| *Staphylococcus aureus* | 3061 | +++ |
| *Staphylococcus epidermidis* | 3762 | +++ |
| *Flavobacterium arborescens* | 3750 | ++ |
| *Flavobacterium flavescens* | 3085 | + |
| *Bacillus alvei* | 3343 | +++ |
| *Bacillus brevis* | 3331 | +++ |
| *Bacillus cereus* | 3002 | ++ |
| *Bacillus circulans* | 3329 | ++ |
| *Bacillus coagulans* | 3557 | ± |
| *Bacillus firmus* | 3330 | +++ |
| *Bacillus macerans* | 3490 | ± |
| *Bacillus megaterium* | 3003 | ++ |
| *Bacillus polymyxa* | 3020 | ++ |
| *Bacillus pumilus* | 3813 | ++ |
| *Bacillus roseus* | 3041 | +++ |
| *Bacillus sphaericus* | 3341 | +++ |
| *Bacillus subtilis* | 3007 | +++ |
| *Clostridium acetobutylicum* | 3346 | +++ |
| *Clostridium botulinum* | 3732 | +++ |
| *Clostridium kainantoi* | 3353 | +++ |

TABLE 2.—Continued

| Microorganism [a] | IFO No. | Bacteriolytic activity [b] |
|---|---|---|
| Brevibacterium ammoniagenes | 12071 | − |
| Brevibacterium leucinophagum | 12147 | + |
| Brevibacterium protophormiae | 12128 | − |
| Lactobacillus acidophilus | 3532 | − |
| Lactobacillus brevis | 3345 | − |
| Lactobacillus bulgaricus | 3326 | + |
| Lactobacillus casei | 3425 | + |
| Lactobacillus fermenti | 3071 | ± |
| Lactobacillus plantarum | 3070 | ± |
| Lactobacillus sake | 3541 | +++ |
| Streptococcus faecalis | 3865 | +++ |
| Streptococcus lactis | 3434 | + |
| Streptococcus salivarius | 3350 | + |
| Streptococcus thermophilus | 3535 | + |
| Leuconostoc dextranicum | 3349 | ++ |
| Leuconostoc mesenteroides | 3426 | + |
| Achromobacter liquidum | 3084 | + |
| Arthrobacter simplex | 3530 | + |
| Azotobacter indicum | 3744 | ± |
| Kurthia zopfii | 12084 | ++ |
| Protaminobacter alboflavus | 3704 | ± |
| Acetobacter aceti | 3284 | − |
| Aerobacter aerogenes | 3317 | − |
| Chromobacterium violaceum | 3740 | − |
| Corynebacterium aquaticum | 12154 | − |
| Escherichia coli | 3366 | − |
| Proteus morganii | 3848 | − |
| Pseudomonas aeruginosa | 3452 | − |

[a] Fresh cells of *Micrococcus lysodeikticus* harvested by centrifugation were used in place of lyophilized cells thereof in the standard assay method.

[b] +++ = more than 80% reduction in A 600 mμ within 10 minutes; ++ = more than 80% reduction in A 600 mμ within 60 minutes; + = 40–80% reduction in A 600 mμ within 60 minutes; ± = 10–40% reduction in A 600 mμ within 60 minutes; − = less than 10% reduction in A 600 mμ within 60 minutes.

(vii) The strains as given in Table 3 are grown on bouillon agar slants, and the cells are harvested and suspended in 0.01 M tris-HCl buffer (pH 8) in such a concentration as $10^{11}$ counts of cells per 1 ml. of the buffer. To the suspension is added the enzyme preparation in an amount of 120 LU/ml., followed by keeping at 37° C. for 60 minutes. Numbers of survival cells in the solution are counted. The result is as follows:

TABLE 3

| Strain: | Survival cells/total cells before the treatment |
|---|---|
| *Micrococcus lysodeikticus* IFO 3333 | $2 \times 10^{-9}$ |
| *Staphylococcus aureus* IFO 3061 | $2 \times 10^{-5}$ |
| *Staphylococcus epidermidis* IFO 3762 | $2 \times 10^{-7}$ |
| *Flavobacterium arborescens* IFO 3750 | $2 \times 10^{-5}$ |
| *Bacillus cereus* IFO 3002 | $5 \times 10^{-4}$ |

(viii) To 4.0 ml. of 0.01 M tris-HCl buffer of pH value as specified are added lyophilized cells of *Micrococcus lysodeikticus* or *Staphylococcus aureus* as a substance in an amount of A600 mμ=0.60. To the suspension is added 80 LU of the enzyme preparation. Under 37° C., the relative bacteriolytic activity is measured by the manner described before. The result is summarized in FIG. 1. From the result, the optimum pH range for the enzyme preparation is found as about from pH 7.5 to pH 9.5.

Figure 2:
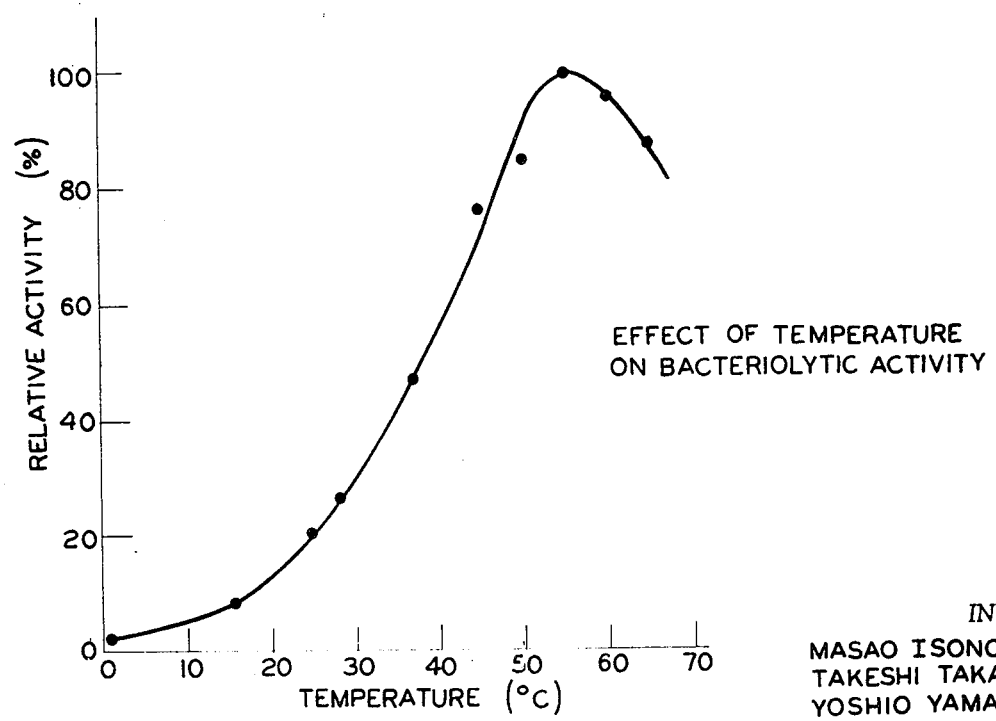

(ix) 4.0 milliliters of 0.01 M tris-HCl buffer (pH 8.0) containing lyophilized cells of *Micrococcus lysodeikticus* in an amount of A 600 mμ=0.60 is heated at the temperature specified, to which 0.1 ml. of the enzyme preparation in water (1 mg./ml.) is added, and on the mixture is measured the relative bacteriolytic activity by the manner described before. The result is summarized in FIG. 2. From the result, an optimum temperature range is found as from about 45 to about 65° C.

Figure 3:
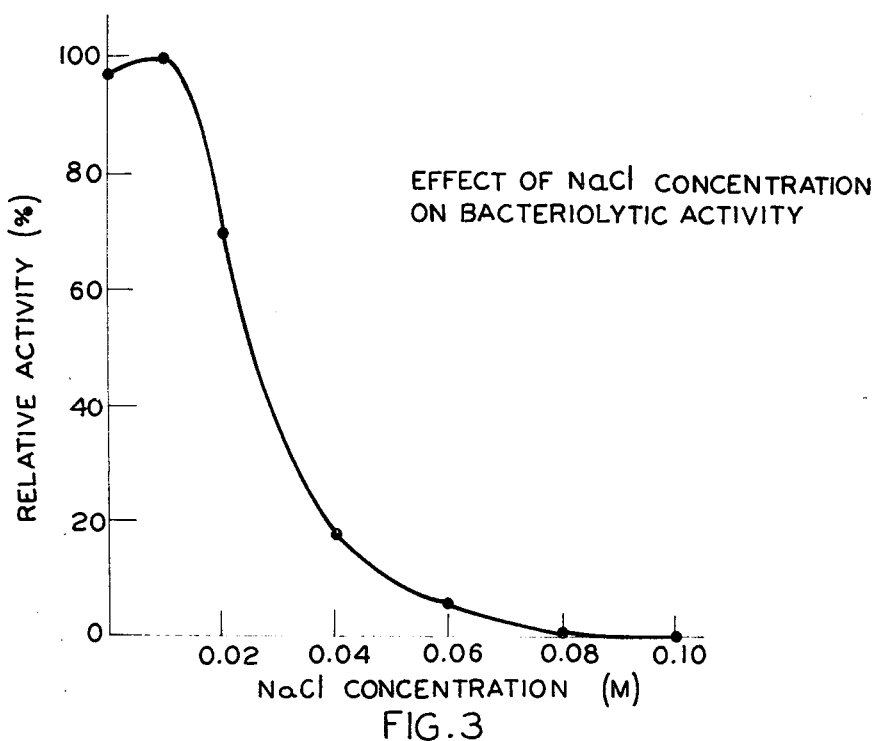

(x) 4.0 milliliters of the same buffer as in (ix) is added NaCl in an amount as specified. To the mixture is added 100 LU of the enzyme preparation. On the mixture is measured the relative bacteriolytic activity by the manner described before. The result is summarized in FIG. 3. From the result, it is revealed that the enzyme preparation shows a high bacteriolytic activity in NaCl concentration of less than about 0.02 M.

Figure 4:
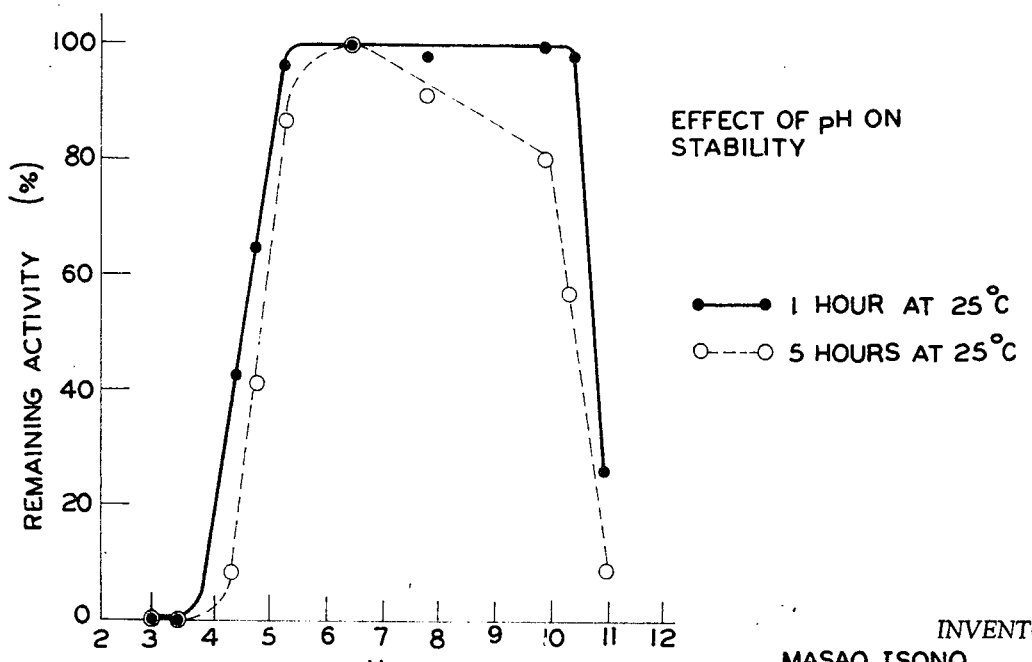

(xi) The powdery enzyme preparation is dissolved, in a concentration of 1 mg./ml., into 0.05 M buffers (pH 2 to 3—glycine-HCl buffer, pH 4 to 5—acetate buffer, pH 6 to 7—phosphate buffer, pH 8 to 9—tris-HCl buffer and pH 10 to 11—carbonate buffer), and the solution is kept at 25° C. for 1 hour or 5 hours. On thus treated solution is measured for remaining bacteriolytic activity by the manner described before. The result is summarized in FIG. 4. From the result, it is revealed that the enzyme activity is stable at a pH range from about 5 to about 10.

Figure 5:
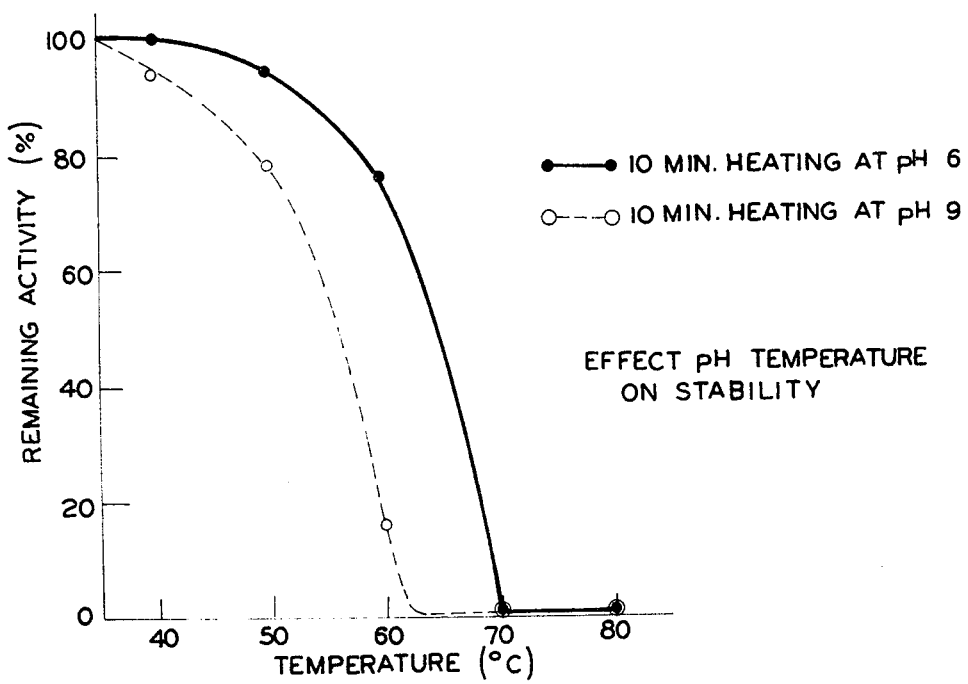

(xii) The powdery enzyme preparation is dissolved, in a concentration of 1 mg./ml., into 0.05 M phosphate buffer (pH 6) or tris-HCl buffer (pH 9), followed by heating at the temperature specified for 10 minutes. On thus treated solution is measured the remaining bacteriolytic activity by the manner described before. The result is summarized in FIG. 5. From the result it is revealed that the enzyme activity is stable at a temperature up to about 50 to 65° C.

(xiii) The enzyme preparation dissolved in a buffer of pH value of 6 to 9 is kept in a refrigerator. After about 1 month, the remaining activity of the enzyme preparation is about 90% of the original one.

(xiv) The powdery enzyme preparation is kept at 3° C., 25° C. or 37° C. Even after 6 months, the enzyme activity is not reduced.

Figure 6:
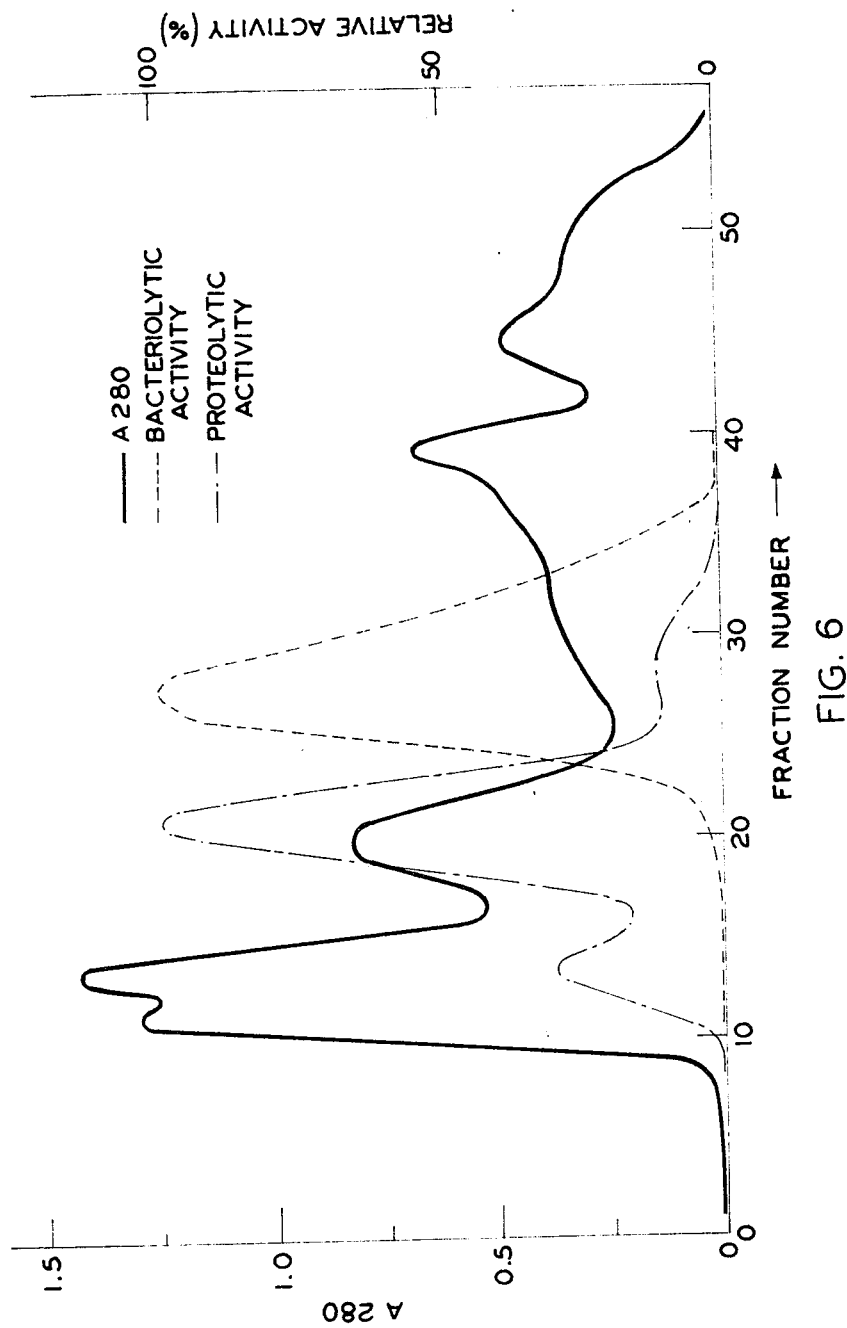

(5) 3 weight parts of the enzyme preparation obtained in (4) is dissolved in 300 volume parts of distilled water, chromatographed through a column (4 x 42 cm.) packed with Sephadex G–50 (manufactured and sold by Pharmacea, Uppsala, Sweden) and eluted by distilled water, whereupon an elution curve as in FIG. 6 is given (one fraction: 16 volume parts).

(6) The 16th to 34th fractions inclusive in the process (5) are taken and lyophilized to obtain 0.8 weight part of white powder, which is then dissolved in 50 volume parts of 0.01 M tris-HCl buffer (pH 8). The solution is loaded on a column (3.2 x 28 cm.) packed with carboxymethyl cellulose (manufactured and sold by Seikagaku Fine Biochemicals, Toyko, Japan; 0.79 mili equivalent/g.), which is previously equilibrated with 0.1 M tris-HCl buffer (pH 8). Elution is conducted by feeding continuously into the column at first 200 volume parts of 0.1 M tris-HCl buffer (pH 8) and then 750 volume parts of the same buffer while NaCl content in the buffer is continuously raised to 0.6 M. The eluate is successively taken each 10 volume parts at a time. Protein content (as A280 mμ), bacteriolytic activity and proteolytic activity are determined on each fraction. This procedure gives an elution curve as in FIG. 7 and a result as described in Table 4.

TABLE 4

| Fraction number | Bacteriolytic activity | | Proteolytic activity (PU/ml.) |
|---|---|---|---|
| | *Micrococcus lysodeikticus* | *Staphylococcus aureus* [1] | |
| P–1 (No. 21) | 0 | 0 | 470 |
| P–2 (No. 42) | 0 | 0 | 485 |
| P–3 (No. 47) | 0 | 0 | 2,290 |
| L–1 (No. 52) | 5,900 | 3,500 | 1,000 |
| L–2 (No. 64) | 10,100 | 60,000 | 700 |

[1] As substrate.

Figure 7:
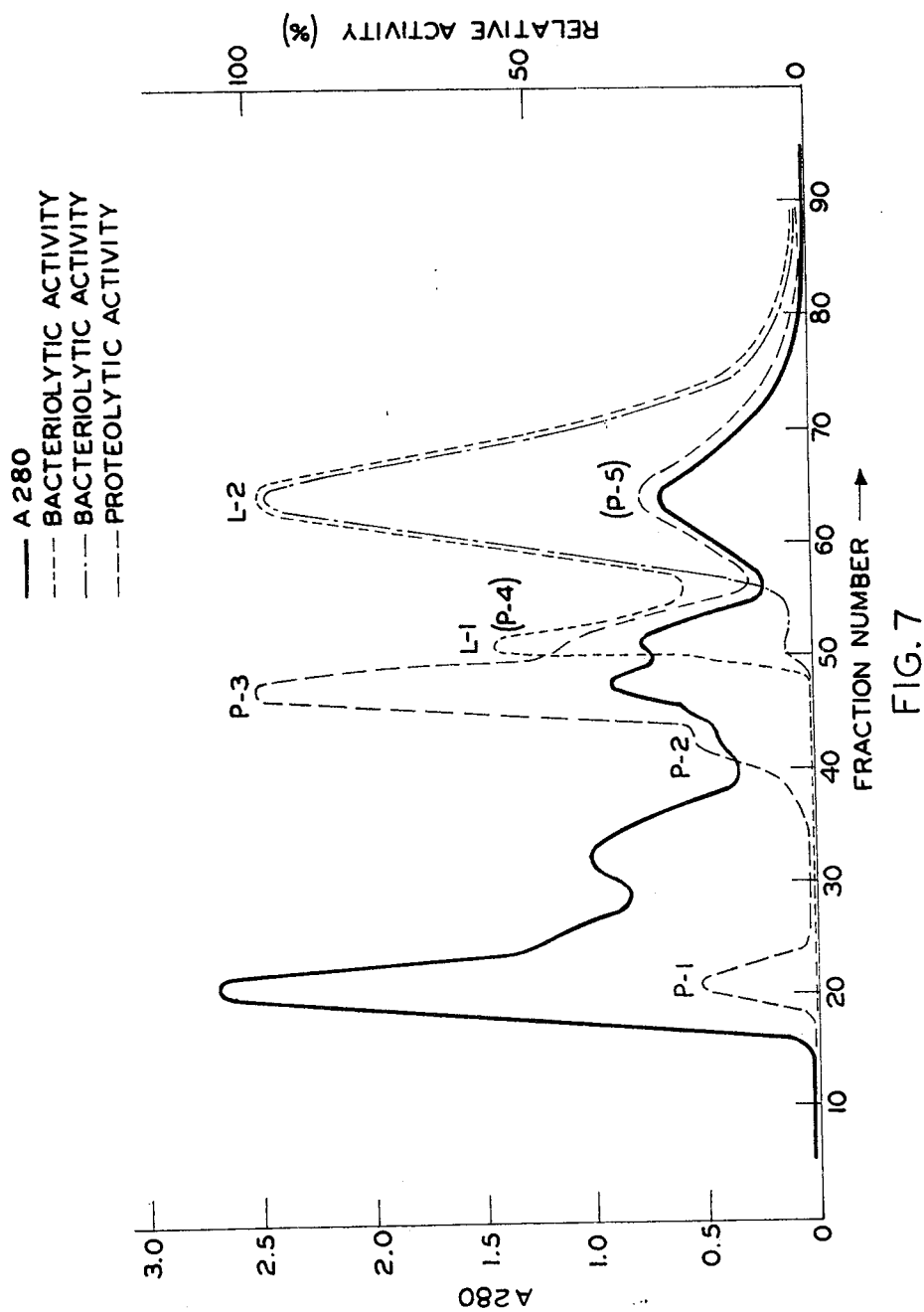

The above result and FIG. 7 are summarized as follows:

(a) Bacteriolytic principles are found in two fractions L–1 and L–2, the latter being more active than the former.

(b) Proteolytic principles are found in five fractions P–1, P–2, P–3, P–4 and P–5, (c) All the enzymes except the fraction P–1 are adsorbed at pH 8 on a cation ion exchange resin, carboxymethyl cellulose, and therefore they are considered to be basic proteins.

Figure 8:
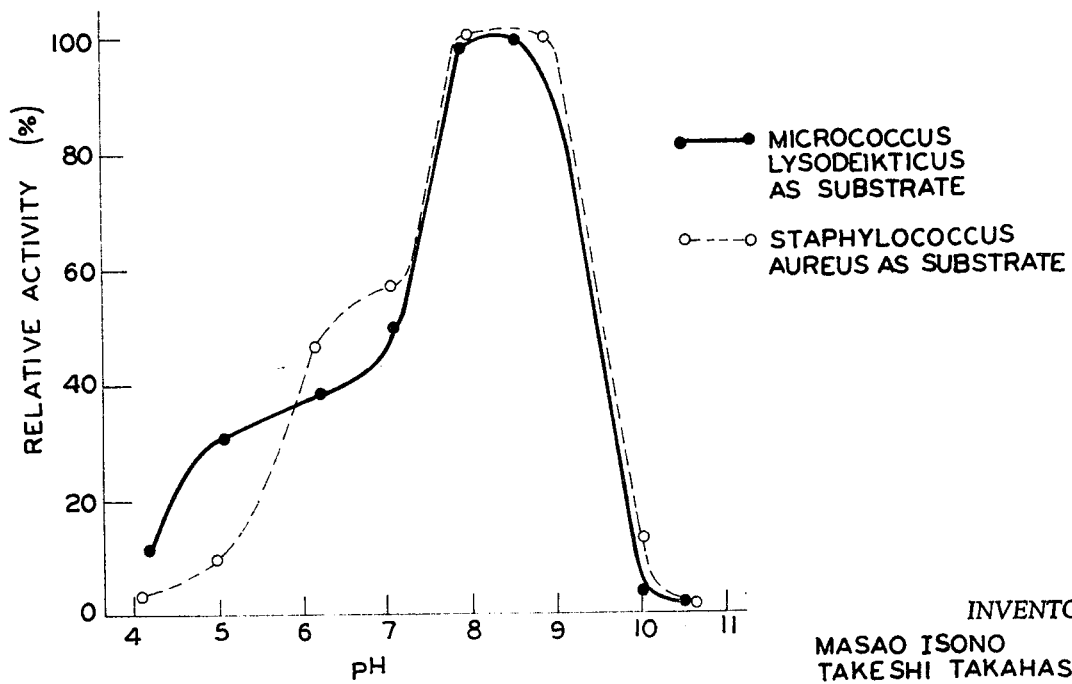
Figure 9:
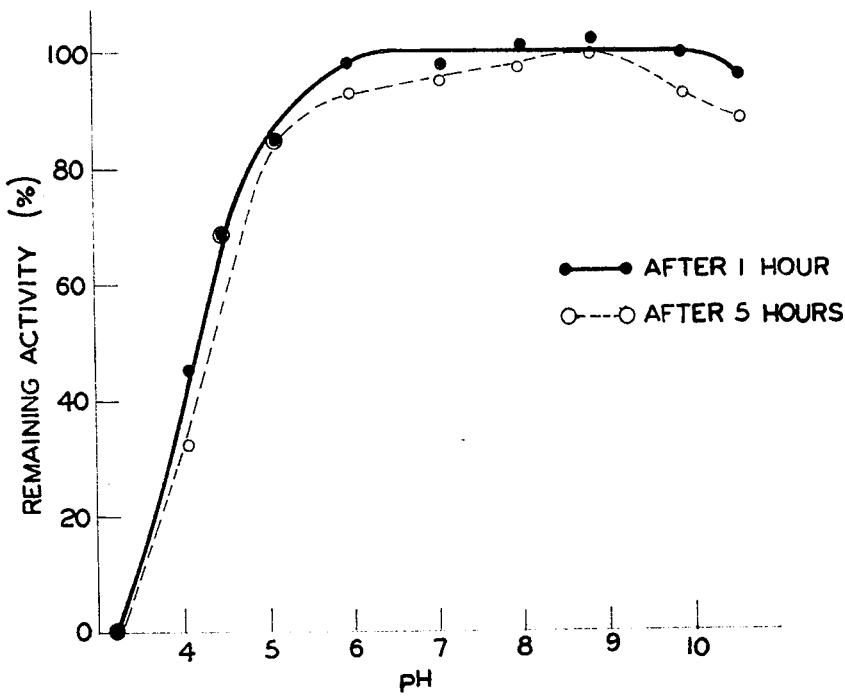

(7) The fraction L–1 prepared in (6) is, after desalted and concentrated, chromatographed utilizing a column (2 x 20 cm.) packed with the same carboxymethyl cellulose as in (6) by the same manner as in (6), whereby the purified enzyme of fraction L–1 is obtained. The optimum pH value for thus purified enzyme of the fraction L–1 is about 8 to 9 (refer to FIG. 8, a similar test to that in (4) is conducted), and the enzyme is unstable at an acid range of pH value of 5 or less, while it is stable at an alkaline range (refer to FIG. 9, a test similar to that in (4) is conducted).

Figure 10:
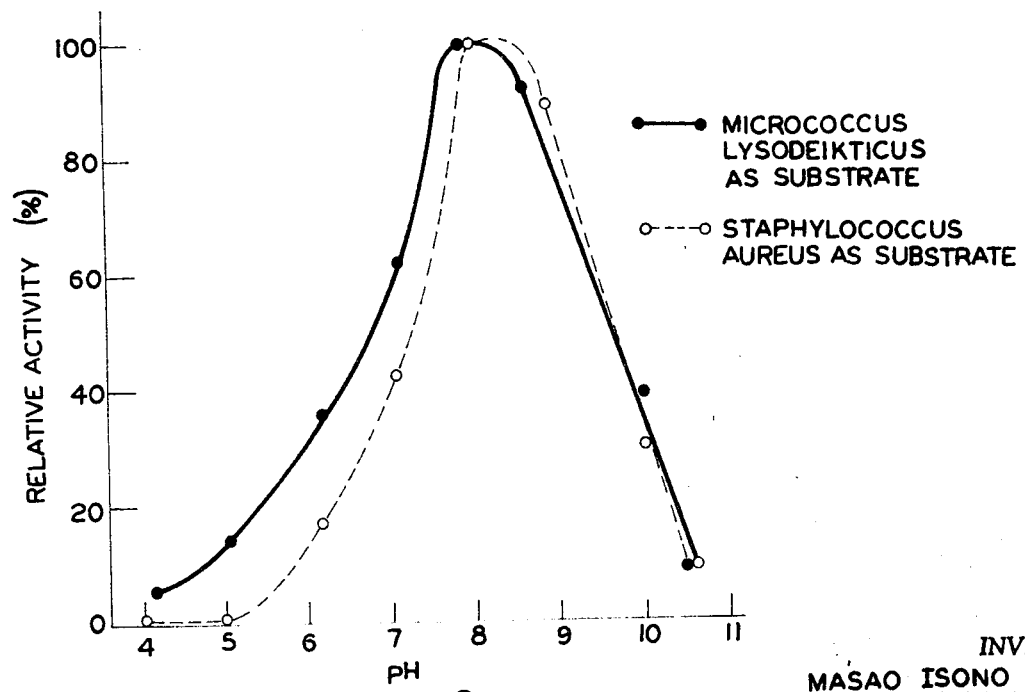
Figure 11:
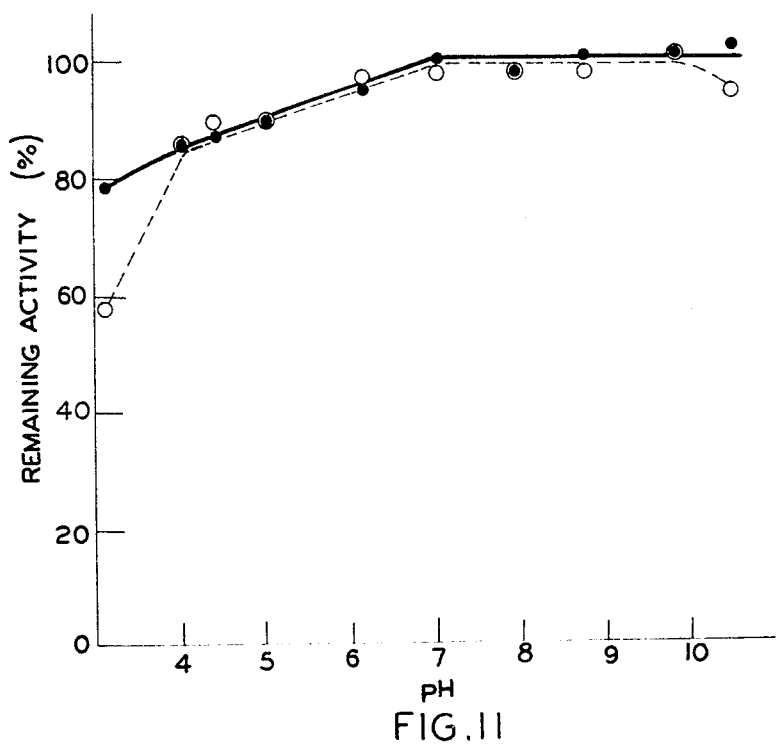

The fraction L-2 prepared in (6) is, after desalted and concentrated, chromatographed utilizing a column (2 x 20 cm.) packed with the same carboxymethyl cellulose as in (6) by the same manner as in (6), whereby purified enzyme of the fraction L-2 is obtained. The optimum pH value of the purified enzyme of the fraction L-2 is about 8 (refer to FIG. 10, a similar test to that in (4) is conducted), and the enzyme is slightly unstable at an acid range but more stable than the purified enzyme of the fraction L-1 at the acid range (refer to FIG. 11, a similar test to that in (4) is conducted).

Figure 12:
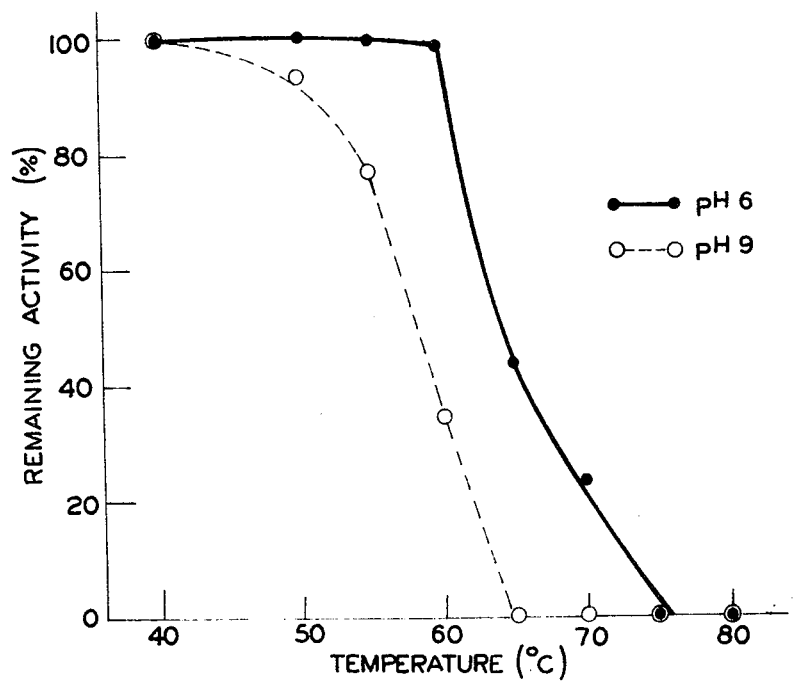

The purified enzyme of the fraction L-2 is heated for 10 minutes at pH 6 and 9 and the remaining bacteriolytic activity is determined by a method similar to that in (4) to give a result as shown in FIG. 12. The result shows that the enzyme of the fraction L-2 is stable at pH 6 under heating up to 60° C., while it is stable at pH 9 under heating up to 50° C.

Figure 13:
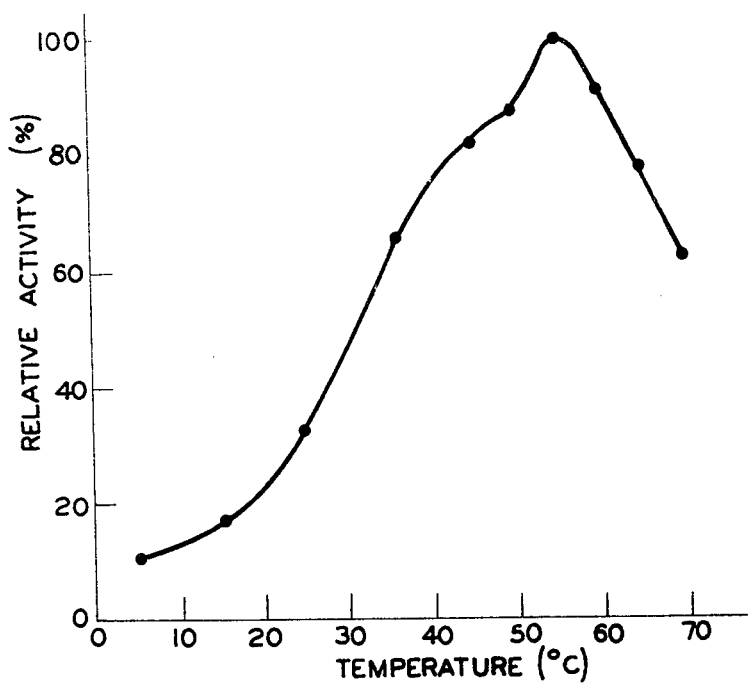

The bacteriolytic activity of the enzyme at pH 8 varies with temperature as shown in FIG. 13 (a test similar to that in (4) is conducted). Namely, the activity is maximum at about 55° C. at pH 8.

From the result shown in FIGS. 12 and 13, it is concluded that the optimum temperature range of the purified enzyme of the fraction L-2 is from about 25 to about 55° C.

Then, the bacteriolytic activity of the above obtained purified enzymes of the fractions L-1 and L-2 is determined as follows:

Fresh cells of the microorganisms described in Table 4 are harvested and then suspended in 0.01 M tris-HCl buffer (pH 8). To each of the suspension is added the purified enzyme in an amount of about 300 LU/ml., followed by keeping at 37° C. On thus treated suspension, bacteriolytic activity is measured according to the manner as described before. The result is as follows:

TABLE 5

| Microorganism | Bacteriolytic activity | |
| --- | --- | --- |
| | Enzyme L-1 | Enzyme L-2 |
| *Bacillus substilis* IFO 3007 | ++ | ++ |
| *Micrococcus lysodeikticus* IFO 3333 | + | +++ |
| *Sarcina lutea* IFO 3232 | + | +++ |
| *Lactobacillus sake* IFO 3541 | + | + |
| *Streptococcus faecalis* IFO 3865 | ++ | +++ |
| *Leuconosioc dextranicum* IFO 3349 | ++ | +++ |
| *Clostridium botulinum* IFO 3732 | ++ | ++ |
| *Staphylococcus aureus* IFO 3061 | + | +++ |
| *Brevibacterium leucinophagum* IFO 12147 | + | + |
| *Achromobacter liquidum* IFO 3084 | ± | + |
| *Azotobacter indicum* IFO 3744 | + | + |
| *Flavobacterium flavescens* IFO 3085 | + | + |
| *Escherichia coli* IFO 3366 | − | − |
| *Pseudomonas aeruginosa* IFO 3452 | − | − |

Note.—+++ = more than 80% reduction in A 600 mμ within 10 minutes; ++ = more than 80% reduction in A 600 mμ within 60 minutes; + = 40 to 79% reduction in A 600 mμ within minutes; − = 10 to 39% reduction in A 600 mμ within 60 minutes.

The above result shows that bacteriolytic activity of the enzyme of the fracton L-2 is stronger than that of L-1, but that there is found no significant difference between the bacteriolytic spectrum of the enzyme L-1 and that of L-2.

(8) The purified enzyme of the fraction L-2, which is obtained in (7), is concentrated by means of lyophilization or ultrafiltration technique. To the concentrate is added ammonium sulfate or sodium chloride. The mixture is weakly alkalized and stored in a cold room for several days, whereby the enzyme is crystallized. By filtration or centrifugation, crystalline enzyme of the fraction L-2 is obtained.

The properties of the crystalline enzyme are as follows:

(a) Isoelectric point (by electrophoresis utilizing cellulose acetate membrane): about pH 10

(b) Molecular weight: About 10,000 (by Andrew's method, P. Andrews Biochemical Journal, 91, 222, 1964, calculated from the elution point using Sephadex G-75 column) to about 25,000 (by an ultracentrifugation technique).

(c) A typical elementary analysis: C: 14.19%, H: 5.57%, N: 15.25%, S: 0.71%.

(d) Ultraviolet absorption spectrum (pH 7): Refer to FIG. 14.

(e) Infrared absorption spectrum: (KBr) Refer to FIG. 15.

(f) Amino acid analysis: A typical result is shown in Table 6.

TABLE 6

| Amino acid | ηmoles/ 3.82 mg. enzyme | The least number of amino acid residue/ molecule of enzyme |
| --- | --- | --- |
| Lysine | 0.32 | 1 |
| Histidine | 0.93 | 2–4 |
| Arginine | 0.61 | 1–3 |
| Tryptophan | 0.33 | 1 |
| Aspartic acid | 3.26 | 10–12 |
| Threonine | 1.97 | 6–8 |
| Serine | 2.76 | 8–10 |
| Glutamic acid | 1.52 | 4–6 |
| Proline | 1.15 | 3–5 |
| Glycine | 3.73 | 11–13 |
| Alanine | 1.90 | 5–7 |
| Cysteine | 0.46 | 1–3 |
| Valine | 0.51 | 1–3 |
| Methionine | 0.37 | 1 |
| Isoleucine | 0.50 | 1–3 |
| Leucine | 1.28 | 3–5 |
| Tyrosine | 1.76 | 5–7 |
| Phenyl alanine | 0.87 | 2–4 |

The enzyme prepared according to the present invention can be used, taking advantage of its excellent bacteriolytic activity, for detergents, antiseptics for foodstuffs, a bactericidal agent for oral use in preventing dental cavities, bactericidal eye-washes, bactericidal cosmetics, etc.

When used in conjuction in detergent compositions, the enzyme is used in an amount of about 10 to about 100,000 LU/g. of formulation; when used for antiseptics for foodstuffs, it is used in an amount of about 1 to about 10,000 LU/g. of foodstuffs; when used for bactericidal eye-washes, bactericidal cosmetics or bactericidal agent for oral use in preventing dental cavities, it is used in an amount of about 10 to about 100,000 LU/g. of formulation, and a daily does of the enzyme is about 1 to about 1,000,000 UL/human adult.

The utility of the present enzyme is further described.

(1) Detergent.—The enzyme prepared according to the present invention is incorporated, in per se known manner, into a conventional detergent or cleanser composition which comprises surfactants (e.g. sodium, potassium, ammonium and alkanol ammonium salts of fatty acids, sodium, and potassium alkyl sulfates, alkylamine salts, sodium and potassium olefine sulfates, quaternary alkyl ammonium salts, alkyl pyridinium salts, sodium and potassium olefine sulfonates, sodium and potassium alkyl benzene sulfonates, sodium and potassium alkyl benzene sulfonates, polyoxyethylene alkylphenol ethers, polyhydric alcohol alkyl esters, polyoxyethylene alkyl esters, sugar esters, alkyl taurine salts, condensates of higher amines and monochloroacetic acid sodium salt etc.), builders (e.g. tri-polyphosphates, sulfates, borates, etc.), carboxymethyl cellulose, fluorescent dyes, scents, bleaching agents (e.g. perborates), chelating agents (e.g. $N(CH_2COONa)_3$), skin-protective agents (e.g. dimethyl-laurylaminoxide), disinfectant (e.g. tertiary amines), etc.

Typical formulations of detergents using the present enzyme:

(1)

| | Weight parts |
| --- | --- |
| Sodium n - $C_{12}$ - alkylsulfate | 25 |
| Sodium tri-phosphate | 40 |
| Sodium silicate | 5 |
| Sodium sulfate | 29 |
| Carboxymethyl cellulose | 1 |
| Enzyme preparation prepared in Example 4 | 1 |

11

(2)

| | |
|---|---|
| Sodium n-$C_{12}$-alkylbenzene sulfonate | 25 |
| Sodium tri-phosphate | 40 |
| Sodium sulfate | 29 |
| Sodium silicate | 5 |
| Carboxymethyl cellulose | 1 |
| Enzyme prepared in Example 8 | 2 |

(3)

| | |
|---|---|
| Water | 55 |
| Sodium tetrapropylbenzene sulfonate | 18 |
| Sodium n-$C_{12}$-alkylphenol ether sulfate | 12 |
| Lauryldiethanolamine | 5 |
| Sodium xylenesulfonate | 10 |
| Enzyme preparation prepared in Example 4 | 2 |

Test:

Bacteriolytic activity of the present enzyme in detergent compositions:

0.1 percent tris-buffer (pH 7.9) solution (0.1 volume part) of the enzyme preparation prepared in Example 4 is added to a mixture of 2.0 volume parts of tris-buffer (pH 7.9) suspension ($A_{600}$=1) of *Staphylococcus aureus* and 2.0 volume parts of 0.4% aqueous solution of the above-mentioned formulation without the enzyme or commercially available detergent, followed by stirring.

On the mixture, turbidity is measured in terms of absorbance at 600 mμ by the same manner as before.

The result is described in Table 7.

TABLE 7

| Detergent added | pH of the mixture | Enzyme | Absorbance at 600 Mμ after— | | | | |
|---|---|---|---|---|---|---|---|
| | | | 0 min. | 2.5 mins. | 5 mins. | 10 mins. | 15 mins. |
| None | 7.9 | − | 0.58 | 0.58 | 0.58 | 0.57 | 0.57 |
| | 7.9 | + | 0.58 | 0.24 | 0.11 | 0.04 | 0.02 |
| 1 | 8.4 | − | 0.57 | 0.57 | 0.56 | 0.55 | 0.55 |
| | 8.4 | + | 0.57 | 0.44 | 0.32 | 0.11 | 0.05 |
| 2 | 8.3 | − | 0.57 | 0.57 | 0.56 | 0.55 | 0.55 |
| | 8.3 | + | 0.57 | 0.45 | 0.33 | 0.12 | 0.04 |
| 3 | 8.4 | − | 0.52 | 0.52 | 0.52 | 0.51 | 0.51 |
| | 8.4 | + | 0.52 | 0.38 | 0.23 | 0.06 | 0.03 |
| 4 | 8.6 | − | 0.52 | 0.52 | 0.52 | 0.51 | 0.51 |
| | 8.6 | + | 0.51 | 0.38 | 0.19 | 0.04 | 0.03 |
| 5 | 8.2 | − | 0.56 | 0.56 | 0.56 | 0.56 | 0.56 |
| | 8.2 | + | 0.56 | 0.44 | 0.30 | 0.06 | 0.03 |
| 6 | 8.6 | − | 0.56 | 0.56 | 0.56 | 0.55 | 0.55 |
| | 8.6 | + | 0.56 | 0.35 | 0.21 | 0.06 | 0.05 |
| 7 | 8.3 | − | 0.52 | 0.52 | 0.52 | 0.51 | 0.51 |
| | 8.3 | + | 0.52 | 0.19 | 0.14 | 0.06 | 0.05 |

Detergent.—1=the above formulation (1) without the enzyme; 2=the above formulation (2) without the enzyme; 3=the above formulation (3) without the enzyme; 4=ARIEL (trademark) manufactured by Procter & Gamble, France; 5=Bio-luvil (trademark) manufactured by Lever & Kitchen PTY. Ltd., Sydney, Australia; 6=Bio-tex (trademark) manufactured by Fabrique par Breton et Steinbach; 7=Henk-o-mat (trademark) manufactured by Henkel & Cie GmbH, West Germany.

12

(2) Bactericidal agent for oral use in preventing dental cavities:

The enzyme of the present invention can be used as a bactericidal agent for oral use in preventing dental cavities taking advantage of its high bacteriolytic activity. Namely, the enzyme can bacteriolyse such microorganisms as streptococci, staphylococci, micrococci, and bacilli resident in human saliva, which easily become pathogenic under certain conditions. Test:

(a) Lyophilized cells of *Staphylococcus aureus* or *Micrococcus lysodeikticus* are suspended in human saliva at a concentration of about 0.5 mg./ml. To the suspension is added the enzyme preparation prepared in Example 4 at a concentration of 2500 LU/ml., the mixture is incubated at 37° C. and reduction of absorbance at 600 mμ of the suspension during incubation is determined by the same manner as before. As a control, the determination is made on the suspension containing no enzyme preparation.

The result is described in Table 8.

TABLE 8

| Microorganism | Enzyme added | Absorbance at 600 mμ after incubation period of— | | | | | | | | | | | | |
|---|---|---|---|---|---|---|---|---|---|---|---|---|---|---|
| | | 0 min. | 1 min. | 2 mins. | 4 mins. | 6 mins. | 8 mins. | 10 mins. | 12 mins. | 14 mins. | 16 mins. | 18 mins. | 20 mins. | 30 mins. |
| None | None | 0.32 | 0.32 | 0.32 | 0.32 | 0.32 | 0.32 | 0.32 | 0.32 | 0.32 | 0.32 | 0.32 | 0.32 | 0.32 |
| A | None | 0.99 | 0.99 | 0.99 | 0.99 | 0.99 | 0.99 | 0.99 | 0.99 | 0.99 | 0.99 | 0.99 | 0.99 | 0.99 |
| | This enzyme | 0.99 | 0.97 | 0.94 | 0.81 | 0.64 | 0.51 | 0.44 | 0.39 | 0.37 | 0.35 | 0.34 | 0.33 | 0.32 |
| B | None | 0.72 | 0.60 | 0.53 | 0.48 | 0.44 | 0.41 | 0.38 | 0.37 | 0.37 | 0.36 | 0.36 | 0.36 | 0.36 |
| | This enzyme | 0.72 | 0.43 | 0.37 | 0.34 | 0.33 | 0.33 | 0.32 | 0.32 | 0.32 | 0.32 | 0.32 | 0.32 | 0.32 |

NOTE.—A=*Staphylococcus aureus*; B=*Micrococcus lysodeikticus*.

From the above result it is revealed that *Staphylococcus aureus* and *Micrococcus lysodeikticus* are lysed in human saliva by the present enzyme.

(b) On various microorganisms belonging to streptococci, which have been considered as cariogenic microorganisms, the following test is conducted.

Fresh cells of the microorganisms are suspended in 0.1% tris-buffer (pH 7.9). Initial turbidity of the suspension is shown in Table 9. To 4 volume parts of the suspension is added 0.1 volume part of 0.1% tris-buffer solution (pH 7.9) containing 1 part of the enzyme preparation prepared in Example (4). The mixture is incubated at 37° C. and reduction of absorbance at 60 mμ of the mixture during incubation is determined by the same manner as before. As controls, the determination is made on the cell suspension containing no enzyme and on the same mixture as above except using 0.1 volume part of 0.1% tris-buffer solution containing 0.2 part of crystalline egg-white lysozyme in place of that containing 1 part of the enzyme preparation prepared in Example 4. The result is described in Table 9. It is found from the result that the present enzyme preparation shows higher bacteriolytic activity than a crystalline egg-white lysozyme.

TABLE 9

| Substrate microorganism | Enzyme added | Absorbance at 600 mμ after incubation period of— | | | | |
|---|---|---|---|---|---|---|
| | | 0 min. | 2.5 mins. | 5 mins. | 10 mins. | 20 mins. |
| *Streptococcus faecium* IFO 3128 | None | 0.58 | 0.58 | 0.58 | 0.57 | 0.57 |
| | Lysozyme | 0.58 | 0.54 | 0.51 | 0.46 | 0.40 |
| | This enzyme | 0.58 | 0.54 | 0.47 | 0.38 | 0.22 |
| *Streptococcus faecium* IFO 3181 | None | 0.56 | 0.56 | 0.56 | 0.56 | 0.55 |
| | Lysozyme | 0.56 | 0.50 | 0.46 | 0.40 | 0.29 |
| | This enzyme | 0.56 | 0.48 | 0.38 | 0.26 | 0.14 |
| *Streptococcus salivarius* IFO 3350 | None | 0.56 | 0.56 | 0.56 | 0.56 | 0.56 |
| | Lysozyme | 0.56 | 0.56 | 0.56 | 0.54 | 0.53 |
| | This enzyme | 0.56 | 0.51 | 0.41 | 0.28 | 0.15 |

TABLE 9—Continued

| Substrate microorganism | Enzyme added | Absorbance at 600 mµ after incubation period of— | | | | |
|---|---|---|---|---|---|---|
| | | 0 min. | 2.5 mins. | 5 mins. | 10 mins. | 20 mins. |
| *Streptococcus alcalophilus* IFO 3531 | None | 0.56 | 0.56 | 0.56 | 0.56 | 0.56 |
| | Lysozyme | 0.56 | 0.56 | 0.56 | 0.55 | 0.52 |
| | This enzyme | 0.56 | 0.50 | 0.45 | 0.33 | 0.15 |
| *Streptococcus thermophilus* IFO 3535 | None | 0.60 | 0.60 | 0.60 | 0.60 | 0.60 |
| | Lysozyme | 0.60 | 0.58 | 0.57 | 0.53 | 0.48 |
| | This enzyme | 0.60 | 0.61 | 0.54 | 0.50 | 0.42 |
| *Streptococcus bovis* IFO 12057 | None | 0.29 | 0.29 | 0.29 | 0.29 | 0.29 |
| | Lysozyme | 0.29 | 0.29 | 0.28 | 0.26 | 0.24 |
| | This enzyme | 0.29 | 0.23 | 0.19 | 0.09 | 0.03 |
| *Streptococcus bovis* IFO 12058 | None | 0.54 | 0.54 | 0.54 | 0.54 | 0.54 |
| | Lysozyme | 0.55 | 0.55 | 0.55 | 0.55 | 0.54 |
| | This enzyme | 0.55 | 0.50 | 0.46 | 0.37 | 0.22 |
| *Streptococcus faecalis-facecium* intermediate IFO 12367 | None | 0.56 | 0.56 | 0.56 | 0.56 | 0.56 |
| | Lysozyme | 0.56 | 0.56 | 0.54 | 0.53 | 0.50 |
| | This enzyme | 0.56 | 0.56 | 0.56 | 0.53 | 0.47 |
| *Streptococcus faecalis-faecium* intermediate IFO 12366 | None | 0.58 | 0.58 | 0.58 | 0.58 | 0.58 |
| | Lysozyme | 0.58 | 0.57 | 0.54 | 0.51 | 0.48 |
| | This enzyme | 0.58 | 0.56 | 0.54 | 0.50 | 0.41 |
| *Streptococcus faecalis-faecium* intermediate IFO 12368 | None | 0.58 | 0.58 | 0.58 | 0.58 | 0.58 |
| | Lysozyme | 0.58 | 0.54 | 0.51 | 0.45 | 0.36 |
| | This enzyme | 0.58 | 0.52 | 0.45 | 0.34 | 0.15 |
| *Streptococcus lactis* IFO 12546 | None | 0.59 | 0.59 | 0.59 | 0.59 | 0.59 |
| | Lysozyme | 0.59 | 0.58 | 0.57 | 0.56 | 0.55 |
| | This enzyme | 0.59 | 0.53 | 0.49 | 0.41 | 0.33 |
| *Streptococcus equinus* IFO 12553 | None | 0.54 | 0.55 | 0.54 | 0.52 | 0.51 |
| | Lysozyme | 0.54 | 0.54 | 0.53 | 0.52 | 0.50 |
| | This enzyme | 0.54 | 0.48 | 0.39 | 0.29 | 0.17 |
| *Streptococcus faecalis* IFO 12580 | None | 0.56 | 0.55 | 0.56 | 0.56 | 0.55 |
| | Lysozyme | 0.56 | 0.54 | 0.52 | 0.48 | 0.41 |
| | This enzyme | 0.56 | 0.37 | 0.23 | 0.13 | 0.05 |

(c) On 8 strains belonging to cariogenic streptococci which are isolated from human dental plaques or human decayed teeth, the following test is conducted.

Fresh cells of the microorganisms are harvested and suspended in 0.1% of tris-buffer (pH 7.9) at concentration of about 0.03% or in human saliva at a concentration of about 0.03%. To the suspension is added the enzyme preparation prepared in Example 4 at a concentration of 1 mg./ml., followed by incubation at 37° C. On thus treated suspension, bacteriolytic activity is measured by the same manner as before. The result is as follows.

TABLE 10

| | Reaction medium | | | |
|---|---|---|---|---|
| | Tris-buffer | | Saliva | |
| Added enzyme | − | + | − | + |
| Streptococcus sp. strain No.: | | | | |
| K 13 | − | +++ | − | +++ |
| K 17 | − | +++ | − | ++ |
| K 25 | − | + | − | + |
| K 44 | − | ++ | − | ++ |
| Y 25 | − | + | − | + |
| Y 36 | − | +++ | − | ++ |
| T 19 | − | ++ | − | + |
| I 7 | − | +++ | − | ++ |

Note.—The symbols −, +, ++, +++ have the same meaning as described before.

In view of the foregoing tests, it is revealed that the present enzyme can be used for remedy or prevention of cariosity of tooth and other infectious diseases in oral cavity.

The present enzyme can be administered to human body in a formulation of troche, buccal, tooth-paste, tooth-powder, dental ointment, lotion, mouth-wash, high-velocity water jet, chewing gum, losenge, chewable tablet, food and beverage.

Typical formulations: (a) Bactericidal troche:

| | Parts |
|---|---|
| Glucose | 1272 |
| Cornstarch | 690 |
| Spice | 20 |
| Mg stearate | 8 |

Enzyme preparation prepared in Example 4, 10 parts. The above components are shaped into troche by a conventional manner.

(b) Bactericidal buccal:

| | Parts |
|---|---|
| Glucose | 120 |
| Polyethylene glycol M.W. 6000 | 60 |
| Gum arabi | 10 |
| Talc | 4.5 |
| Mg stearate | 0.5 |

Enzyme preparation prepared in Example 4, 5.0 parts. The above components are shaped into buccal by a conventional manner.

(c) Bactericidal tooth-paste:

(i)

0.13 part of citric acid and 0.20 part of ascorbic acid are dissolved in a mixture of 25.0 parts of glycerin and 39.77 parts of distilled water, followed by adjusting pH value to 6.0 to 6.5 by 1 N-NaOH solution. To the solution are added 20.7 parts of polyvinyl chloride powder, 12.0 parts of polystyrene powder, 1.30 parts of sodium lauryl sulfate, 0.80 part of a perfume and 0.01 part of the enzyme preparation prepared in Example 4, followed by agitation to give paste.

(ii)

| | Parts |
|---|---|
| Carbopol 934 (acrylic acid polymer cross-linked by allyl sucrose, manufactured and sold by B.F. Goodrich Chemical Company, U.S.A) | 4.5 |
| Sodium lauryl sulfate | 4.5 |
| Glycerin | 20.0 |
| Perfume | 2.2 |
| Saccharin | 0.40 |
| Distilled water | 98.00 |

The above components are homogeneously admixed with each other, and to the mixture are slowly added 39.0 parts of 5% aqueous NaOH solution and 28.0 volume parts of 10% aqueous triethanolamine solution to give paste of pH 7.4 to 7.6. To the paste is added 0.01 part of the enzyme preparation prepared in Example 4, followed by stirring.

(iii)

| | Parts |
|---|---|
| Active clay | 100 |
| Glycerin | 25 |
| Menthol | 0.7 |
| Saponin | 0.1 |
| Perfume | 0.5 |

The above components are homogeneously admixed with each other and to the mixture are added 20 volume parts of an aqueous solution containing 0.01 part of the enzyme preparation prepared in Example 4, followed by kneading.

(d) Bactericidal tooth-powder:

Into 12.04 parts of distilled water are dispersed 5.0 parts of sorbitol, 0.01 part of the enzyme preparation prepared in Example 4, 1.00 part of sodium lauryl sulfate, 0.06 part of saccharin and 0.75 part of a perfume. To the suspension are added 10.00 parts of fine powdery polyethylene, 70.00 parts of polyvinyl chloride and 0.60 part of sodium carboxymethyl cellulose, followed by kneading to give powdery composition.

(3) Bactericidal eye-wash:

| | Part |
|---|---|
| NaCl | 0.55 |
| KCl | 0.16 |
| $Na_2CO_3$ | 0.06 |
| $Na_2PO_3$ | 0.18 |
| $H_3BO_3$ | 1.20 |
| Methyl cellulose | 0.21 |
| Thimerosal | 0.0002 |
| Benzalkonium chloride | 0.005 |
| The enzyme preparation prepared in Example 4 | 0.05 |
| Distilled water, total | 100 |

The eye-wash shows pH value 7.3 and the same osmotic pressure as that of 1.3% aqueous NaCl solution.

Lyophilized of *Staphylococcus aureus* or *Micrococcus lysodeikticus* are suspended in the above eye-wash at a concentration of $A_{600}$=about 0.6. The mixture is incubated at 37° C. and reduction of absorbance at 600 m$\mu$ of the mixture during incubation is determined by the same manner as before. The result is described in Table 11. As a control, the determination is made on the same mixture as above except containing no enzyme.

the components A at about 60° C. to give an emulsified cream.

| | | Parts |
|---|---|---|
| A | Solid paraffin | 21.34 parts. |
| | Oleyl alcohol | 3.66 parts. |
| B | Ethanolamide | 75.0 parts. |
| C | The enzyme preparation of Example 4 | 0.1 part. |
| | Water | 99.0 parts. |

The component B is slowly added under stirring to the components A at about 60° C. to give an emulsion. To the emulsion is slowly added the components C.

(b) Lotion:

| | Parts |
|---|---|
| Liquid paraffin | 3.25 |
| Isopropyl myristate | 0.3 |
| Cetyl alcohol | 0.55 |
| Ethylene glycol monostearate | 1.1 |
| Polyoxyethylene cetylalcohol ether | 2.2 |
| Polyoxyethylene stearyl alcohol ether | 0.2 |
| Polyoxyethylene octyl alcohol ether | 0.1 |
| Polyethylene glycol 400 distearate | 0.4 |
| Sodium lauryl sulfate | 0.05 |
| The enzyme preparation of Example 4 | 0.1 |
| Water | 91.30 |

What we claim is:

1. A method for producing a bacteriolytic enzyme, which comprises cultivating a bacteriolytic enzyme-producing microorganism belonging to the genus *Achromobacter lyticus* in a medium containing assimilable carbon sources and nitrogen sources until the bacteriolytic enzyme is substantially accumulated in the culture, and recovering the accumulated bacteriolytic enzyme therefrom.

2. A method according to claim 1, wherein the microorganism is *Achromobacter lyticus* M–497–1 (ATCC 21456).

3. A method according to claim 1, wherein the microorganism is *Achromobacter lyticus* P–365, (ATCC 21457).

4. Powdery bacteriolytic enzyme preparation prepared by bacteriolytic enzymes producing microorganism belonging to the genus *Achromobacter lyticus*, and which is characterized by the following properties:

(1) optimum pH range is about 7.5 to about 9.5;
(2) optimum temperature range is from about 45 to about 65° C.;

TABLE 11

| Microorganism | Enzyme | Absorbance at 600 m$\mu$ after incubation period of— | | | | | | | |
|---|---|---|---|---|---|---|---|---|---|
| | | 0 hr. | 1 hr. | 2 hrs. | 3 hrs. | 4 hrs. | 5 hrs. | 6 hrs. | 24 hrs. |
| *Staphylococcus aureus* | None | 0.63 | 0.58 | 0.52 | 0.50 | 0.47 | 0.44 | 0.40 | 0.27 |
| | This enzyme | 0.63 | 0.54 | 0.42 | 0.35 | 0.28 | 0.24 | 0.20 | 0.06 |
| *Micrococcus lysodeikticus* | None | 0.59 | 0.59 | 0.59 | 0.59 | 0.59 | 0.59 | 0.58 | 0.56 |
| | This enzyme | 0.59 | 0.57 | 0.56 | 0.55 | 0.51 | 0.47 | 0.425 | 0.05 |

(4) Bactericidal cosmetics; Typical formulations:

(a) Cream:

| | | Parts |
|---|---|---|
| A | Liquid paraffin | 1.33 parts. |
| | Wax | 2.67 parts. |
| | Stearic acid | 16.0 parts. |
| | Polyoxyethylene lauryl alcohol ether | 3.2 parts. |
| | Polyoxyethylene cetyl alcohol ether | 6.5 parts. |
| | Polyoxyethylene butyl alcohol ether | 1.6 parts. |
| B | Propylene glycol | 0.4 part. |
| | Sodium lauryl sulfate | 0.8 part. |
| | The enzyme preparation of Example 4 | 0.1 part. |
| | Water | 67.0 parts. |

The components B is slowly added under stirring to (3) the activity of the enzyme preparation is greatly inhibited by salt concentration higher than about 0.14 M;
(4) the preparation is stable for about 5 hours at pH range from about 5 to about 10, wherein stability indicates that the remaining activity at the end of 5 hours is not less than about 80% of the original activity;
(5) the preparation is stable for about 10 minutes at a temperature up to about 50 to 65° C., wherein stable is defined as above;

(6) the bacteriolytic spectrum being as follows;

| Microorganism | IFO No. | Bacteriolytic activity |
|---|---|---|
| Micrococcus caseolyticus | 3760 | +++ |
| Micrococcus cerificans | 12552 | − |
| Micrococcus flavus | 3242 | +++ |
| Micrococcus freudenreichii | 3778 | + |
| Micrococcus luteus | 3763 | + |
| Micrococcus lysodiekticus | 3333 | +++ |
| Micrococcus roseus | 3764 | +++ |
| Micrococcus rubens | 3768 | +++ |
| Micrococcus subflavus | 3062 | + |
| Micrococcus ureae | 3767 | − |
| Micrococcus varians | 3765 | +++ |
| Sarcina lutea | 3232 | +++ |
| Sarcina marginata | 3066 | +++ |
| Pediococcus acidilactici | 3884 | +++ |
| Pediococcus pentosaceus | 3892 | ++ |
| Staphylococcus aureus | 3061 | +++ |
| Staphylococcus epidermidis | 3762 | +++ |
| Flavobacterium arborescens | 3750 | ++ |
| Flavobacterium flavescens | 3085 | + |
| Bacillus alvei | 3343 | +++ |
| Bacillus brevis | 3331 | ++ |
| Bacillus cereus | 3002 | ++ |
| Bacillus circulans | 3329 | ++ |
| Bacillus coagulans | 3557 | ± |
| Bacillus firmus | 3330 | +++ |
| Bacillus macerans | 3490 | ± |
| Bacillus megaterium | 3003 | ++ |
| Bacillus polymyxa | 3020 | +++ |
| Bacillus pumilus | 3813 | ++ |
| Bacillus roseus | 3041 | +++ |
| Bacillus sphaericus | 3341 | +++ |
| Bacillus subtilis | 3007 | ++ |
| Clostridium acetobutylicum | 3346 | +++ |
| Clostridium botulinum | 3732 | + |
| Clostridium kaninantoi | 3353 | +++ |
| Brevibacterium ammoniagenes | 12071 | − |
| Brevibacterium leucinophagum | 12147 | + |
| Brevibacterium protophormiae | 12128 | − |
| Lactobacillus acidophilus | 3532 | − |
| Lactobacillus brevis | 3345 | − |
| Lactobacillus bulgaricus | 3326 | + |
| Lactobacillus casei | 3425 | + |
| Lactobacillus fermenti | 3071 | ± |
| Lactobacillus plantarum | 3070 | − |
| Lactobacillus sake | 3541 | +++ |
| Streptococcus faecalis | 3865 | +++ |
| Streptococcus lactis | 3434 | + |
| Streptococcus salivarius | 3350 | + |
| Streptococcus thermophilus | 3535 | + |
| Leuconostoc dextranicum | 3349 | ++ |
| Leuconostoc mesenteroides | 3426 | + |
| Achromobacter liquidum | 3084 | − |
| Arthrobacter simplex | 3530 | + |
| Azotobacter indicum | 3744 | + |
| Kurttia zopfii | 12084 | ++ |
| Protaminobacter alboflavus | 3704 | ± |
| Acetobacter aceti | 3284 | − |
| Aerobacter aerogenes | 3317 | − |
| Chromobacterium violaceum | 3740 | − |
| Corynebacterium aquaticum | 12154 | − |
| Escherichia coli | 3366 | − |
| Proteus morganii | 3848 | − |
| Pseudomonas aeruginosa | 3452 | − |

NOTE.—The symbols for activity being as defined in the specification.

Figure 15:
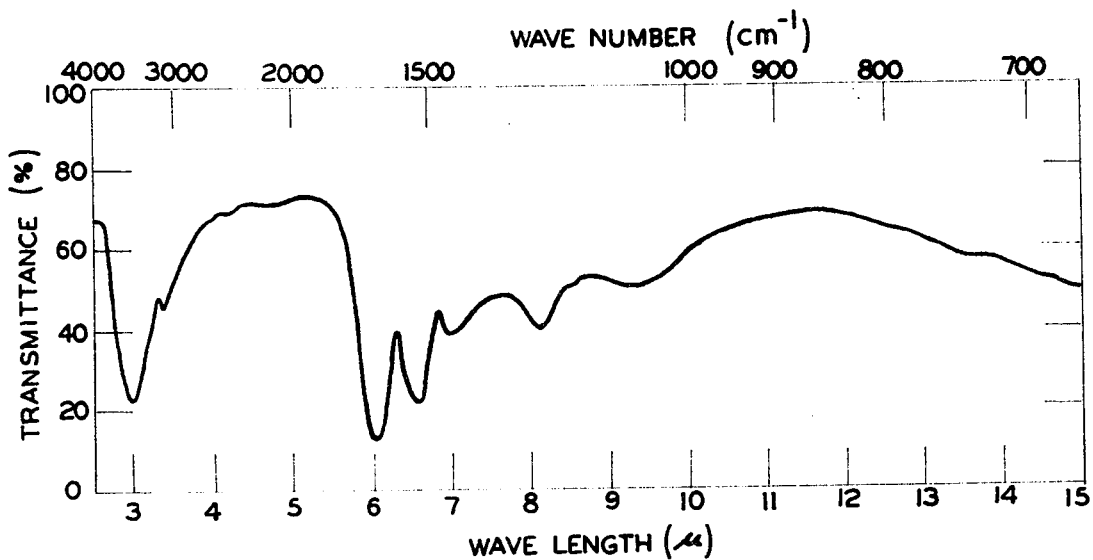

5. Crystalline bacteriolytic enzyme prepared by bacteriolytic enzyme-producing microorganism belonging to the genus *Achromobacter lyticus* which is characterized by the following properties;

(1) isoelectric point is about pH 10;
(2) molecular weight is about 10,000 to about 30,000;
(3) a typical elementary analysis is C: 45.19%, H: 5.57%, N: 15.25% and S: 0.71%;
(4) ultraviolet absorption spectrum (pH 7) is as shown in FIG. 14;
(5) infrared absorption spectrum (KBr) is as shown in FIG. 15;
(6) a typical amino acid analysis is as follows;

| Amino acid | The least number of amino acid residue/molecule of enzyme |
|---|---|
| Lysine | 1 |
| Histidine | 2–4 |
| Arginine | 1–3 |
| Tryptophan | 1 |
| Aspartic acid | 10–12 |
| Threonine | 6–8 |
| Serine | 8–10 |
| Glutamic acid | 4–6 |
| Proline | 3–5 |
| Glycin | 11–13 |
| Alanine | 5–7 |
| Cysteine | 1–3 |
| Valine | 1–3 |
| Methionine | 1 |
| Isoleucine | 1–3 |
| Leucine | 3–5 |
| Tyrosin | 5–7 |
| Phenyl alanine | 2–4 |

References Cited

UNITED STATES PATENTS 3,124,517   3/1964   Eloy _____ 195—66 R

LIONEL M. SHAPIRO, Primary Examiner

U.S. Cl. X.R.

195—66; 252—89, 106; 424—50, 94